(12) United States Patent
Ziarnik et al.

(10) Patent No.: US 9,419,312 B2
(45) Date of Patent: Aug. 16, 2016

(54) DISABLEMENT OF CONNECTION BETWEEN CONNECTION MODULE AND BATTERY

(75) Inventors: Gregory P Ziarnik, Houston, TX (US); Stephen J Higham, Houston, TX (US); Michael R Durham, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1144 days.

(21) Appl. No.: 13/459,502

(22) Filed: Apr. 30, 2012

(65) Prior Publication Data
US 2013/0288491 A1  Oct. 31, 2013

(51) Int. Cl.
*H01M 10/46* (2006.01)
*H02J 7/00* (2006.01)
*H01M 10/42* (2006.01)

(52) U.S. Cl.
CPC .......... *H01M 10/46* (2013.01); *H01M 10/4257* (2013.01); *H01M 10/4264* (2013.01); *H02J 7/0029* (2013.01); *H02J 7/0031* (2013.01); *H02J 7/0036* (2013.01); *H02J 7/0042* (2013.01); *H01M 2010/4271* (2013.01); *H02J 2007/004* (2013.01)

(58) Field of Classification Search
CPC ...... H01M 10/46; H01M 2010/4271; H01M 10/4257; H01M 10/4264; H02J 7/0029; H02J 7/0031; H02J 7/0036; H02J 7/0042; H02J 2007/004
USPC ............... 320/132, 134, 107, 166; 439/51, 52
See application file for complete search history.

(56) References Cited

U.S. PATENT DOCUMENTS

| | | | | |
|---|---|---|---|---|
| 3,652,917 A | * | 3/1972 | Biggs | H02J 7/0078 320/128 |
| 4,902,956 A | | 2/1990 | Sloan | |
| 5,739,596 A | * | 4/1998 | Takizawa | G06F 1/263 307/64 |
| 7,921,311 B2 | | 4/2011 | Ciaffi et al. | |
| 2011/0021401 A1 | * | 1/2011 | Scuilla | A01N 63/02 510/195 |
| 2012/0038315 A1 | * | 2/2012 | Wong | H02J 7/0018 320/107 |

FOREIGN PATENT DOCUMENTS

| | | |
|---|---|---|
| GB | 2336953 | 11/1999 |
| KR | 20070049328 | 5/2007 |

OTHER PUBLICATIONS

Microprocessor Supervisory Circuits Reduce Power Requirements for Portable Consumer, Communications and Industrial Appliances, (Web Page), Sep. 10, 2009.

* cited by examiner

*Primary Examiner* — Nathaniel Pelton
(74) *Attorney, Agent, or Firm* — HP Inc Patent Department

(57) ABSTRACT

Embodiments herein relate to disablement of a connection between a battery and a connection module. In an embodiment, a connection between the battery and a connection module may be disabled if the connection module is drawing current from the battery or if a monitored signal transitions from a high logic level to the low logic level. The connection module is to draw the current or pull the signal down to a low logic level in response to one or more components related to the device becoming exposed or an enclosure related to the device being breached or opened.

14 Claims, 3 Drawing Sheets

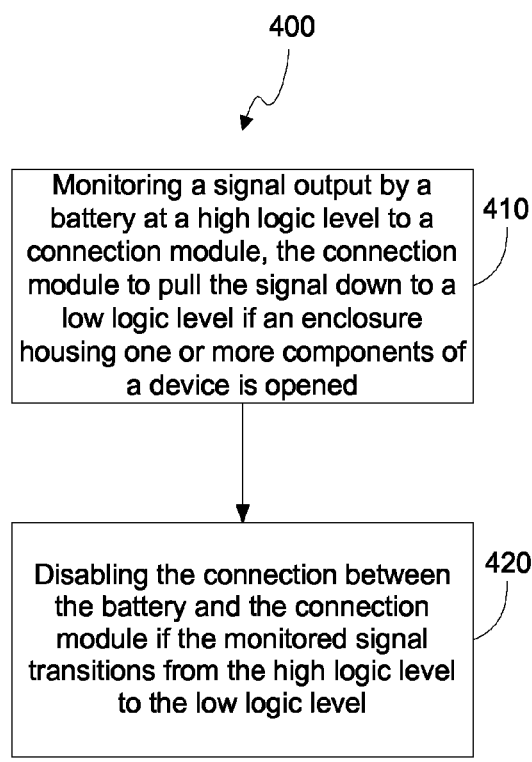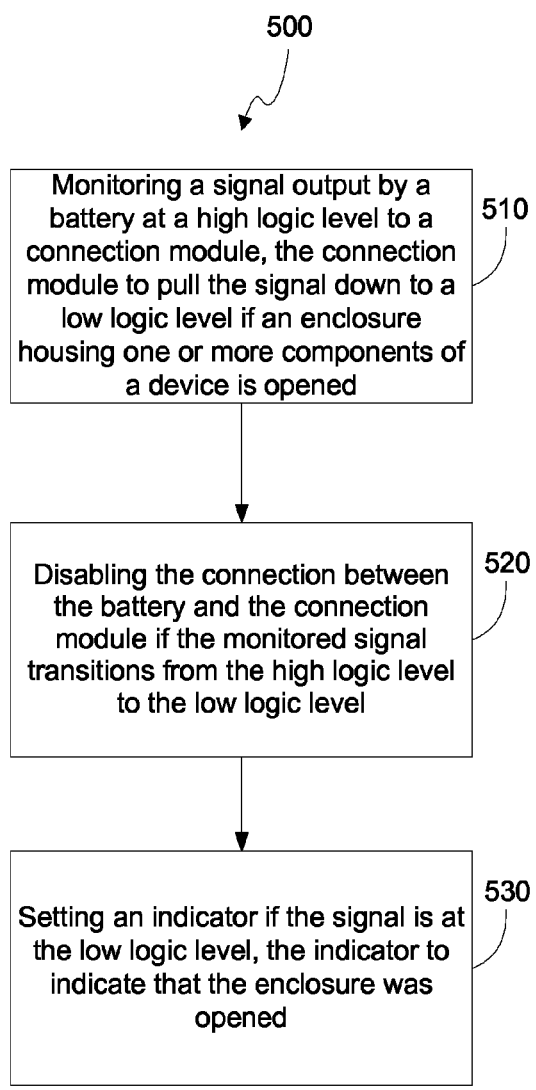

DISABLEMENT OF CONNECTION BETWEEN CONNECTION MODULE AND BATTERY

BACKGROUND

Computing devices, such as desktop computers, generally include a battery, such as a CMOS battery. The battery may be used to power one or more operations while the computing device is powered down. A life of the battery may depend on multiple factors, such as how long the computing device is powered down and/or how often the battery is used to drive a circuit while the computing device is powered down.

Manufacturers and/or service providers may often offer a warranty period for the life of the battery. If the battery dies before the warranty period expires, the manufacturer and/or service provider may be required to service the computing device in order to replace the battery. Estimating the life of the battery may be difficult for manufacturers and/or service providers. Sometimes a larger battery may be used to extend the life of the battery.

BRIEF DESCRIPTION OF THE DRAWINGS

The following detailed description references the drawings, wherein:

FIG. 4 is an example flowchart of a method for disabling a connection between a connection module and a battery; and FIG. 5 is another example flowchart of a method for disabling a connection between the connection module and the battery.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Devices, such as desktop computers, may include a battery, such as a CMOS battery. The battery may be used to power one or more operations while the computing device is powered down. For example, the battery may be used to power a clock and/or a security circuit. An example of a security circuit may include a switch that is triggered when tampering with a case enclosing the device is detected. For instance, the switch may connect the battery to a ground, with the switch initially being in an open position. The switch may transition to a closed position if a panel or hood of the case is removed. The change in current or voltage generated by the switch transitioning to the closed position may be used to signal that the case was opened. Depending on a type of the device and/or type of information stored on the device, a provider or user of the device may take certain actions upon being notified of the tampering. For instance, a diagnostic test may be run to determine if any of components of the device were altered or accessed.

Further, the switch may also be reset to the open position after the notification is received. However, until the notification is received, the switch may remain closed, even if a party tampering with the device restores the case to its original condition, such as by reattaching the panel to the case. As a result, the battery may be continuously drained until the switch is reset, resulting in the life of the battery being shortened. A service call may need to be placed to a provider and/or manufacturer in order for the battery to be replaced.

Embodiments may extend the life of the battery, thus reducing a number of times over a time period that the battery is replaced as well as number of service calls that are placed to replace the battery. For example, an embodiment may include a power module to control a connection between the battery and a connection module. The power module may maintain the connection if the connection module is not drawing current from the battery. If the connection module is drawing the current from the battery, the power module may momentarily maintain the connection before disabling the connection. The connection module is to draw the current in response to one or more components related to the device becoming exposed.

Figure 1:
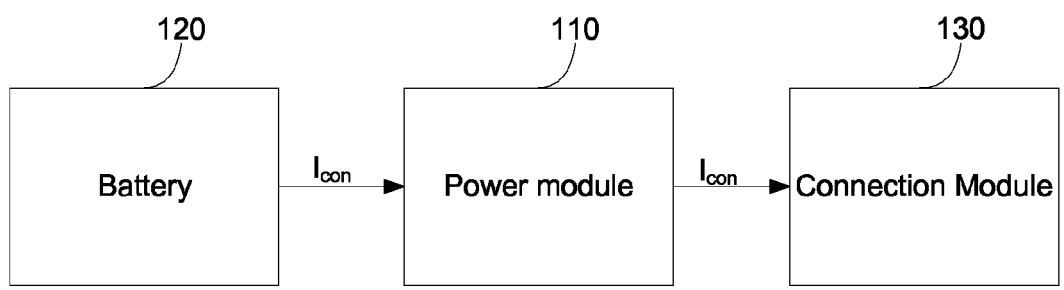
FIG. 1 is an example block diagram of a device to disable a connection between a connection module and a battery.

Referring to the drawings, FIG. 1 is an example block diagram of a device 110 to disable a connection between a connection module 130 and a battery 120. Embodiments of the device 110 may be included in any type of device including a battery that powers one or more circuits while the device is powered down, such as a notebook computer, a desktop computer, an all-in-one system, a slate computing device, a portable reading device, a wireless email device, a mobile phone, and the like.

In the embodiment of FIG. 1, the device 110 is described as a power module 110. The power module 110 includes a first connector (not shown) connecting to the battery 120 and a second connector (not shown) connecting to the connection module 130. Thus, the battery 120 connects to the connection module 130 via the power module 110. Further, the power module 110 is to control the connection between the battery 120 and the connection module 130. For example, the power module 110 is to maintain the connection if the connection module 130 is not drawing a connection current $I_{con}$ from the battery 120. However, the power module 110 is to momentarily maintain the connection before disabling the connection if the connection module 130 is drawing the connection current $I_{con}$ from the battery 130, as explained in further detail below with respect to FIG. 2.

In another embodiment, the power module 110 may monitor a signal from the battery 120 to the connection module 130, such as by monitoring a voltage along the connection. The power module 110 may disable the connection between the battery 120 and the connection module 130 if the signal transitions from a high logic level to a low logic level. When the connection is disabled, the signal may return to the high logic level. The high logic level may refer to a first voltage range, such as approximately 3 V and the low logic level may refer to a second voltage range lower than the first voltage range, such as approximately 0 V. The power module 110 may include any type of mechanical and/or electromechanical device for enabling and disabling the connection, such as a capacitor or transistor.

The battery 120 may include any type of power storage device, such as a complementary metal-oxide-semiconductor (CMOS) battery. As shown in FIG. 1, the battery may power a circuit, such as a path from the battery 120 to the connection module 130. The battery 120 may also power, other components (not shown), such as a real-time clock, a CMOS memory, and the like. Example voltages of the battery 130 may be 3 or 5 volts (V). The power module 110 may control the connection between the battery 120 and the connection module 130 when a device, such as a desktop, is in a low power state, such as a sleep or power off state. The battery 120 may be used to power at least one of the components when the device is in the low power state.

The connection module 130 may be any type of device capable of drawing the connection current $I_{con}$ from the battery 120 and/or changing the logic level of the signal in response to one or more components (not shown) related to the device 110 becoming exposed or an enclosure related to the device 110 being breached or opened. The connection module 130 may draw the connection current $I_{con}$ from the battery 120 and/or change the logic level of the signal by, for example, using a switch that is connected to the battery 110 and connected to a lower voltage than that of the battery 110, as explained in further detail below with respect to FIG. 2. For example, the connection module 130 may raise the connection current $I_{con}$ from 0 micro-amps (µA) to 30 to 50 µA, and/or change the logic level of the signal from high to low, such as from 3 or 5 V to 0 V.

The connection module 130 may draw the connection current $I_{con}$ in response to one or more components (not shown) related to the device 110 becoming exposed and/or part of an enclosure related to the device 110 being breached. For example, the device 110 may be included in a desktop device. Thus, the connection module 130 may draw the connection current $I_{con}$ and/or transition the signal from the high logic level to the low logic level if internal components of the desktop, such as a memory, CPU, motherboard, controller and the like, become exposed and/or physically accessible. In another example, the enclosure may include a case. Thus, the connection module 130 may draw the connection current $I_{con}$ and/or transition the signal from the high logic level to the low logic level if the case is breached, such as by a hood or panel of the case being removed and/or dislodged.

Further, even if the one or more components related to the device 110 are no longer exposed and/or at least part of the enclosure related to the device 110 is no longer breached, the connection module 130 may continue to attempt to draw the connection current $I_{con}$ and/or maintain the signal at the low logic level. Thus, despite a present condition of the one or more components or enclosure related to the device 110, the connection module 130 may be able to indicate that the one or more components related to the device 110 were previously exposed and/or at least part of the enclosure related to the device 110 was previously breached.

For example, if the panel of the case is removed, the connection module 130 may start drawing the connection current $I_{con}$ and/or transition the signal from the high logic level to the low logic level. Then, if the panel is reattached to the case, the connection module 130 may still continue to attempt to draw the connection current $I_{con}$ from the battery 120 and/or continue to pull-down the signal to the low logic level. However, the power module 110 may disable the connection between the battery 120 and the connection module 130 after the connection module 130 has drawn the connection current $I_{con}$ and/or the signal has transitioned from the high logic level to the low logic level. Thus, the connection current $I_{con}$ from the battery 120 may be stopped or reduced and/or the signal may return to the high logic level. Hence, embodiments of the power module 110 may conserve power of the battery 120 by preventing or reducing the likelihood of the connection module 130 from continuously draining the battery 130 after the one or more components related to the device 110 are exposed and/or part of an enclosure related to the device 110 is breached.

Figure 2:
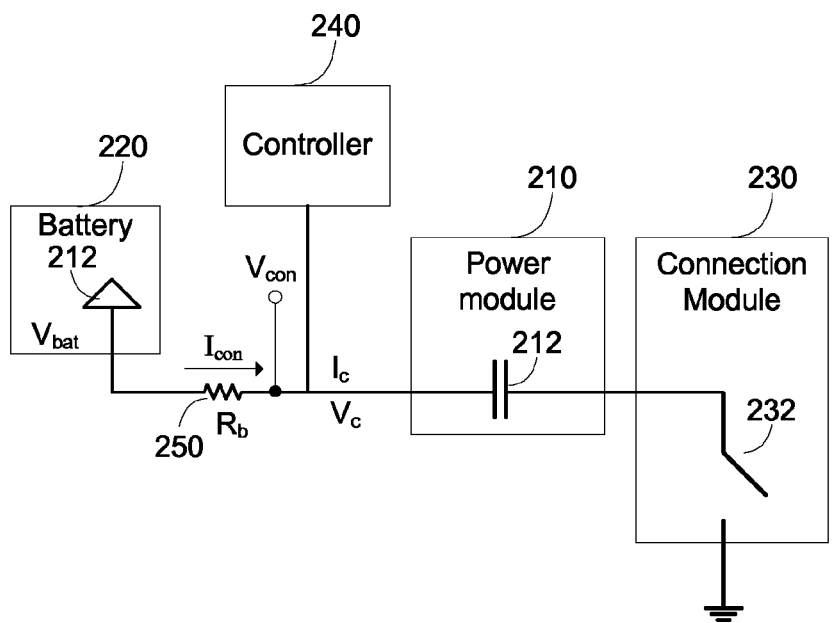
FIG. 2 is another example block diagram of a device to disable a connection between the connection module and a battery.

FIG. 2 is another example block diagram of a device 210 to disable a connection between the connection module 230 and a battery 220. Embodiments of the device 210 may be included in any type of device including a battery that powers one or more circuits while the device is powered down, such as a notebook computer, a desktop computer, an all-in-one system, a slate computing device, a portable reading device, a wireless email device, a mobile phone, and the like.

In the embodiment of FIG. 2, the device 210 is described as a power module 210. The power module 210, the battery 220, and the connection module 230 of FIG. 2 may include the functionality of the power module 110, the battery 120 and the connection module 230 of FIG. 1. Similar to FIG. 1, the power module 210 connects the battery 220 to the connection module 230. The embodiment of FIG. 2 further includes a controller 240, as described below.

The power module 210 is shown to include a capacitor 212 connecting the battery 220 and the connection module 230. An example capacitance of the capacitor 212 may be 100 micro-Farads (µF). The battery 220 is shown to include a voltage source 212. The connection module 230 is shown to include a switch 232, with a first end of the switch 232 connected to a ground and a second end of the switch 232 connected to the capacitor 212. A battery resistor 250 is connected between the voltage source 212 and the capacitor 212. An example resistance of the battery resistor 250 may be 100 kilo-Ohms (KΩ).

The one or more components related to device 210 may not initially be exposed or breached, such as after a provider delivers a desktop to a client. At this time, the switch 332 is open. However, if the one or more components related to device 210 become exposed or breached, such as when an unauthorized party removes a hood or panel of a case of the desktop, then the switch 232 closes and remains closed, regardless of the one are more components not being exposed again after being exposed, as explained above. For example, the switch 232 may remain closed even if the removed panel is attached back to the case of the desktop.

Thus, the connection module 230 may continue to attempt to draw the connection current $I_{con}$ after the one or more components related to the device 210 are exposed, regardless if the one more components are no longer exposed afterward. However, the capacitor 212 may prevent the connection module 230 from continuing to draw the connection current $I_{con}$ after the one or more components are exposed. For example, the switch 232 is to be closed if the one or more components related to the device 210 are exposed and/or the enclosure related to the device 210 is breached. As the result of the switch 232 closing, the signal is pulled down to the ground.

Hence, the connection current $I_{con}$ flows across the capacitor 212 until the capacitor 212 becomes fully charged. The connection current $I_{con}$ does not flow across the capacitor 212 after the capacitor 212 becomes fully charged, despite the switch 232 being closed. An example time for the capacitor 212 to become fully charged may be 100 micro-seconds (µS). Further, a connection voltage $V_{con}$ across the connection drops while the connection current $I_{con}$ flows, causing the signal to transition from the high logic level to the low logic level. Nonetheless, after the capacitor 212 becomes fully charged and the connection current, $I_{con}$ stops, the connection voltage $V_{con}$ rises again and the signal transitions back to the high logic level.

In the embodiment of FIG. 2, the controller 240 is to measure at least one of the connection current $I_{con}$ and the connection voltage $V_{con}$ at the connection. The controller 240 may include an integrated circuit (IC), control logic, an electronic circuit, and/or combinations thereof. For example, the controller may include a super Input/Output (I/O) controller or an application-specific integrated circuit (ASIC). Further, the controller 240 may include an ammeter (not shown) to measure the connection current $I_{con}$ and/or a voltmeter (not shown) to measure the connection voltage $V_{con}$ along the connection.

The controller 240 may indicate, for example, to a user or administrator, that the one or more of the components were exposed and/or that the enclosure was breached, if the measured voltage $V_{con}$ drops below a threshold voltage $V_t$ and/or the measured current $I_{con}$ rises above a threshold current $I_t$.

Measuring the connection voltage $V_{con}$ may be similar to measuring the signal. The controller 240 may set an indicator (not shown) to indicate that the one or more of the components were exposed and/or the enclosure has been breached, if the signal is measured to have the low logic level, e.g. a voltage level below the threshold voltage $V_t$, or the measured current $I_{con}$ is greater than or equal to the threshold current $I_t$.

For example, the threshold voltage $V_t$ may be approximately 2.5 V and the threshold current $I_t$ may be approximately 5 µA. In this case, if the measured voltage $V_{con}$ drops below 2.5 V and/or the measured current $I_{con}$ rises above 5 µA, the controller 240 may set an indicator, such as a bit or flag, to indicate that the one or more of the components were exposed or that the enclosure was breached.

The controller 240 may also control the connection module 230 to stop drawing the connection current $I_{con}$ after the controller 240 indicates that the one or more of the components were exposed or that the enclosure was breached. For example, upon the desktop transitioning from the low power state to a high power state, like power on, and transmitting an alert to the user and/or administrator, the controller 240 may reset the indicator and/or command the connection module 230 to reset the switch 232 to be open. Once, the switch 232 is open again, the capacitor 212 may discharge. Thus, the power module 210 may enable the connection between the battery 210 and the connection module 230 again after the connection module 230 stops attempting to pull the signal down to the low logic level.

Figure 3:
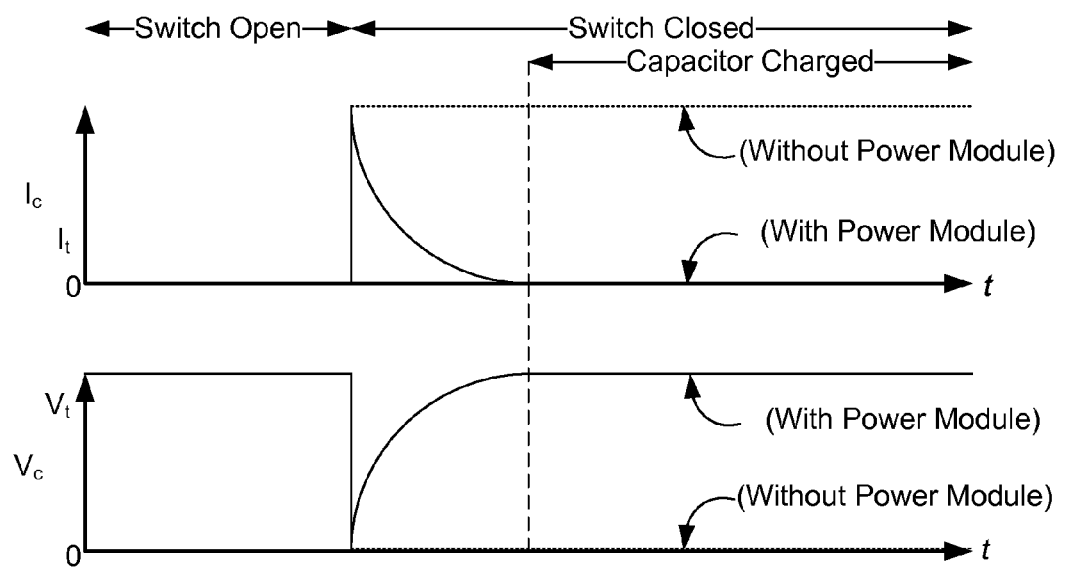
FIG. 3 shows example graphs of a connection voltage and a connection current both with and without a power module.

FIG. 3 shows example graphs of a connection voltage $V_{con}$ and a connection current $I_{con}$ both with and without the power module 210. Although the graphs are described below with reference to the device 210 of FIG. 2, a relationship of the graphs may also apply to other suitable embodiments, such as device 110. The horizontal dotted lines in FIG. 3 denote instances of the connection voltage $V_{con}$ and the connection current $I_{con}$ if the battery 220 and the connection module 230 were connected directly without the power module 210 while the solid lines in FIG. 3 denote instances of the connection voltage $V_{con}$ and the connection current $I_{con}$ in the embodiments, such as the when the power module 210 connects the battery 220 to the connection module 230 in FIG. 2.

In FIG. 3, the one or more components related to the device 210 may initially not be exposed and/or at least part of the enclosure related to the device 110 may not initially be breached, such as when a provider first delivers and sets up the desktop according to a client's specification. At this point, the connection module 130 may not attempt to draw the connection current $I_{con}$ from the battery 120 and/or change the logic level of the signal. Thus, initially the switch 232 is open, resulting in approximately 0 µA being measured for the connection current $I_{con}$ and a voltage greater than or equal to the threshold voltage, such as 3 or 5 V, being measured for the connection voltage $V_{con}$. However, the switch 232 closes when the one or more components related to the device 210 are exposed and/or at least part of the enclosure related to the device 110 is breached. At this point, the connection current $I_{con}$ rises from approximately 0 µA to an amperage greater than the threshold current $I_t$, such as 30 µA, and the connection voltage $V_{con}$ drops from a voltage above the threshold voltage $V_t$, such as 3 or 5 V, to approximately 0 V.

As the switch 232 may remain closed for an indefinite period of time, if the power module 210 is absent, the connection current $I_{con}$ may maintain an amperage greater than the threshold current $I_t$ and the connection voltage $V_{con}$ may maintain a voltage less than the threshold voltage $V_t$, while the switch 232 remains closed, as shown by the dotted horizontal lines. Thus, without the power module 210, the battery 210 may continuously be drained until the switch 232 is reset to be open.

However, a shown by the solid lines, the connection current $I_{con}$ gradually begins to reduce in amperage and the connection voltage $V_{con}$ gradually rises as the capacitor 212 charges, despite the switch 232 remaining closed when the power module 210 is present. Eventually, the capacitor 212 becomes fully charged. At this point, the connection current $I_{con}$ has returned to approximately 0 A and the connection voltage $V_{con}$ has returned to a voltage greater than the threshold voltage $V_t$. Thus, with the power module 210, the power of the battery 210 may be preserved after the switch 232 is closed. Hence, the battery 210 may last longer, thus saving costs by lessening a number of times the battery 210 is replaced over a time period. Moreover, as the connection voltage $V_{con}$ still momentarily drops below the threshold voltage $V_t$ and the connection current $I_{con}$ still momentarily rises above the threshold current $I_t$, the controller 240 is still able to measure the connection voltage $V_{con}$ and/or current $I_{con}$ to determine when the one or more components related to the device 210 are exposed and/or at least part of the enclosure related to the device 110 is breached.

FIG. 4 is an example flowchart of a method 400 for disabling a connection between a connection module and a battery. Although execution of the method 400 is described below with reference to the device 210, other suitable components for execution of method 400 will be apparent to those of skill in the art, such as the device 110.

In the embodiment of FIG. 4, at block 410, the power module 210 monitors the signal output by the battery 220 at a high logic level to the connection module 230. The connection module 230 is to pull the signal down to a low logic level if an enclosure housing one or more components related to the device 210 is opened. At block 420, the power module 210 disables the connection between the battery 220 and the connection module 230 if the monitored signal transitions from the high logic level to the low logic level. The connection module 230 continues to attempt to pull the signal down to the low logic level even if the enclosure is closed after being opened.

FIG. 5 is another example flowchart of a method 500 for disabling a connection between the connection module and the battery. Although execution of the method 500 is described below with reference to the device 210, other suitable components for execution of method 500 will be apparent to those of skill in the art, such as the device 110.

In the embodiment of FIG. 5, at block 510, the power module 210 monitors the signal output by the battery 220 to the connection module 230. The connection module 230 is to pull the signal down to a low logic level if an enclosure housing one or more components related to the device 210 is opened. At block 520, the power module 210 disables the connection between the battery 220 and the connection module 230 if the monitored signal transitions from a high logic level to the low logic level. The connection module 230 continues to attempt to pull the signal down to the low logic level even if the enclosure is closed after being opened. At block 530, the controller 240 sets an indicator if the signal is at the low logic level. The indicator indicates that the enclosure was opened. The power module 210 re-enables the connection between the battery 220 and the connection module 230 if the connection module 230 stops attempting to pull the signal down to the low logic level.

According to the foregoing, embodiments disclosed herein may extend the life of the battery by reducing an amount of time the battery is drained to drive a circuit. The circuit is activated after one or more components related to a device become exposed or an enclosure related to the device is breached or opened. Thus, the battery may be less likely to fail, resulting in fewer service calls and/or battery replacements over a time period. Hence, labor and/or parts costs may be reduced for a manufacturer and/or provider of the device.

We claim:

1. A device, comprising:
a power module to control a connection between a battery and a connection module, wherein
the power module includes a capacitor between the battery and the connection module and is to maintain the connection if the connection module is not drawing a current from the battery, and
the power module, depending on a type of a component being powered by the battery, is to momentarily maintain the connection before disabling the connection when the connection module is drawing the current from the battery, wherein
the connection module is to draw the current in response to the component related to the device becoming exposed, wherein the connection module continues to attempt to draw the current after the component is no longer exposed, and wherein the capacitor prevents the connection module from continuing to draw the current after the component is exposed and the capacitor is fully charged.

2. The device of claim 1, wherein,
the connection module includes a switch, with a first end of the switch connected to a ground and a second end of the switch connected to the battery, and
the switch is to be closed when the component related to the device is exposed.

3. The device of claim 2, wherein the current is to flow across the capacitor when the switch is closed and until the capacitor becomes fully charged, the current is to not flow across the capacitor after the capacitor is fully charged.

4. The device of claim 2, wherein,
the component is not initially exposed and the switch is to be open when the component is not initially exposed, and
the switch remains closed regardless of the component not being exposed after being exposed.

5. The device of claim 2, wherein,
the power module is to control the connection between the battery and the connection module when the device is in a low power state,
the battery is to power the component when the device is in the low power state, and
the connection module is to reset the switch to be open after the device transitions from the low power state to a high power state.

6. The device of claim 1, further comprising:
a controller to measure the current and a voltage at the connection, wherein the controller is to indicate to at least one of a user and an administrator that the component was exposed when the measured voltage drops below a threshold voltage and the measured current rises above a threshold current.

7. The device of claim 6, wherein the controller is to control the connection module to stop drawing the current after indicating to at least one of the user and the administrator that the component was exposed.

8. A device, comprising:
a power module to monitor a signal from a battery to a connection module, wherein
the connection module is to pull the signal down to the low logic level if part of an enclosure related to the device is breached, and
the power module is to momentarily maintain, dependent on a type of the device powered by the battery, and then disable a connection between the battery and the connection module if the signal transitions from a high logic level to a low logic level, the disabling of the connection to return the signal to the high logic level, wherein the power module includes a capacitor between the battery and the connection module, wherein the connection module attempts to draw a current after the component is exposed, wherein the connection module continues to attempt to draw the current after the component is no longer exposed, and wherein the capacitor prevents the connection module from continuing to draw the current after the component is exposed and the capacitor is fully charged.

9. The device of claim 8, further comprising:
a controller to measure the signal, the controller to set an indicator to indicate that the enclosure has been breached if the signal is measured to have the low logic level.

10. The device of claim 9, wherein the power module enables the connection between the battery and the connection module after the controller sets the indicator and the connection module stops attempting to pull the signal down to the low logic level.

11. The device of claim 9, wherein,
the controller is at least one of an I/O controller and an application-specific integrated circuit (ASIC), and
the enclosure includes a case and the enclosure is breached if a panel of the case is removed.

12. A method, comprising:
monitoring a signal output by a battery at a high logic level to a connection module, the connection module to pull the signal down to a low logic level if an enclosure housing a component related to a device is opened;
a power module to momentarily maintain the connection between the battery and the connection module, wherein whether the connection is momentarily maintained is dependent on a type of the component, and wherein the power module includes a capacitor between the battery and the connection module;
attempting to draw a current after the component is exposed; and
wherein the connection module continues to attempt to draw the current after the component is no longer exposed;
disabling the connection between the battery and the connection module to prevent the connection module from continuing to draw current after the component is exposed and when the monitored signal transitions from the high logic level to the low logic level.

13. The method of claim 12, further comprising:
setting an indicator when the signal is at the low logic level, the indicator to indicate that the enclosure was opened, wherein
the connection module continues to attempt to pull the signal down to the low logic level when the enclosure is closed after being opened.

14. The method of claim 13, wherein the connection is re-enabled when the connection module stops attempting to pull the signal down to the low logic level.

* * * * *